---

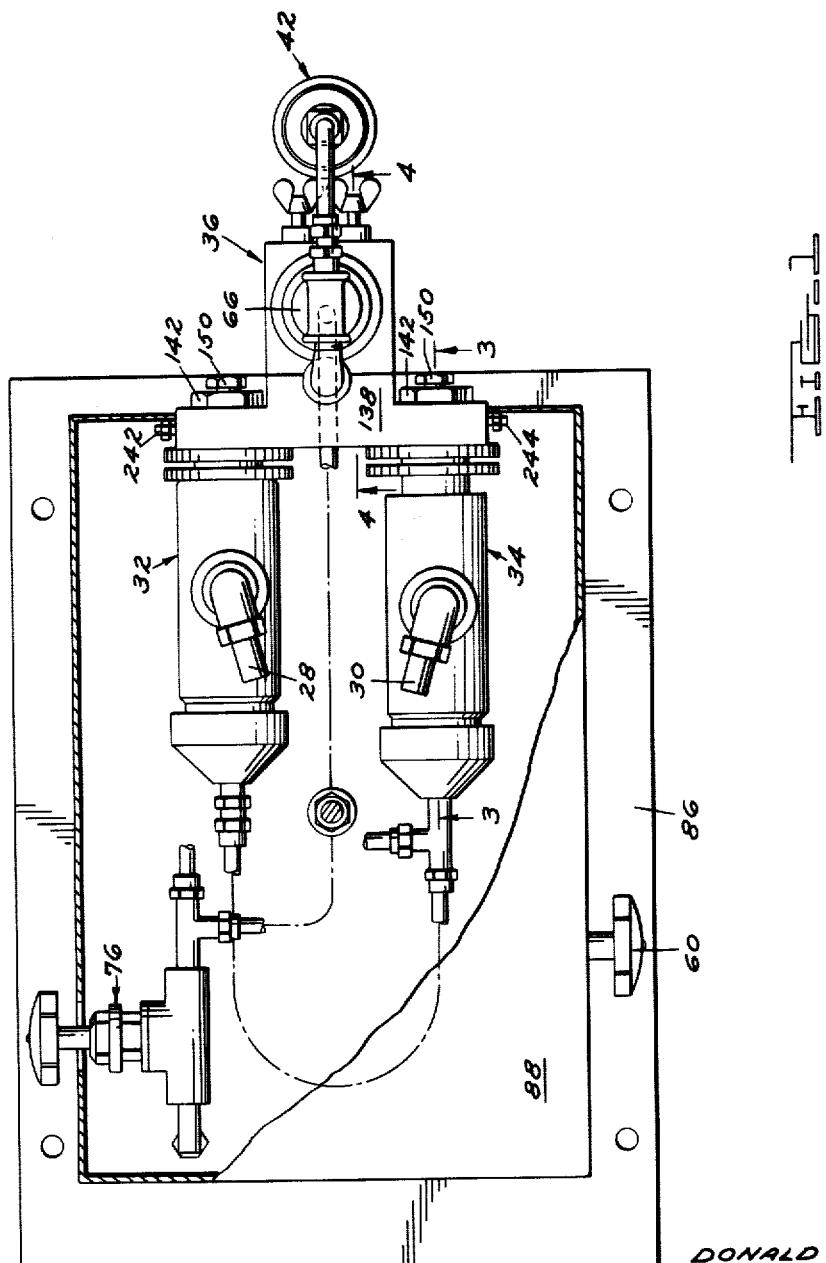

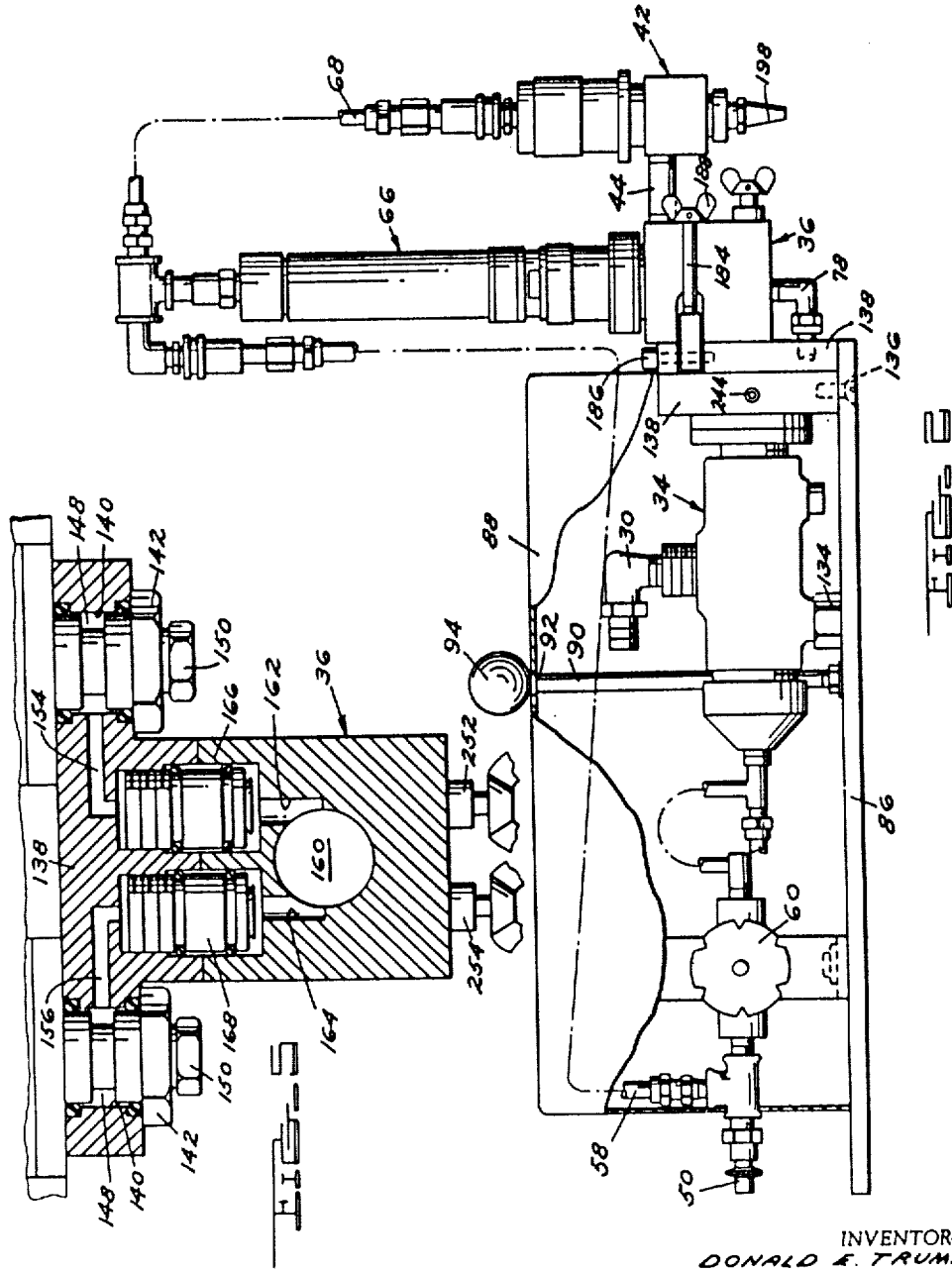

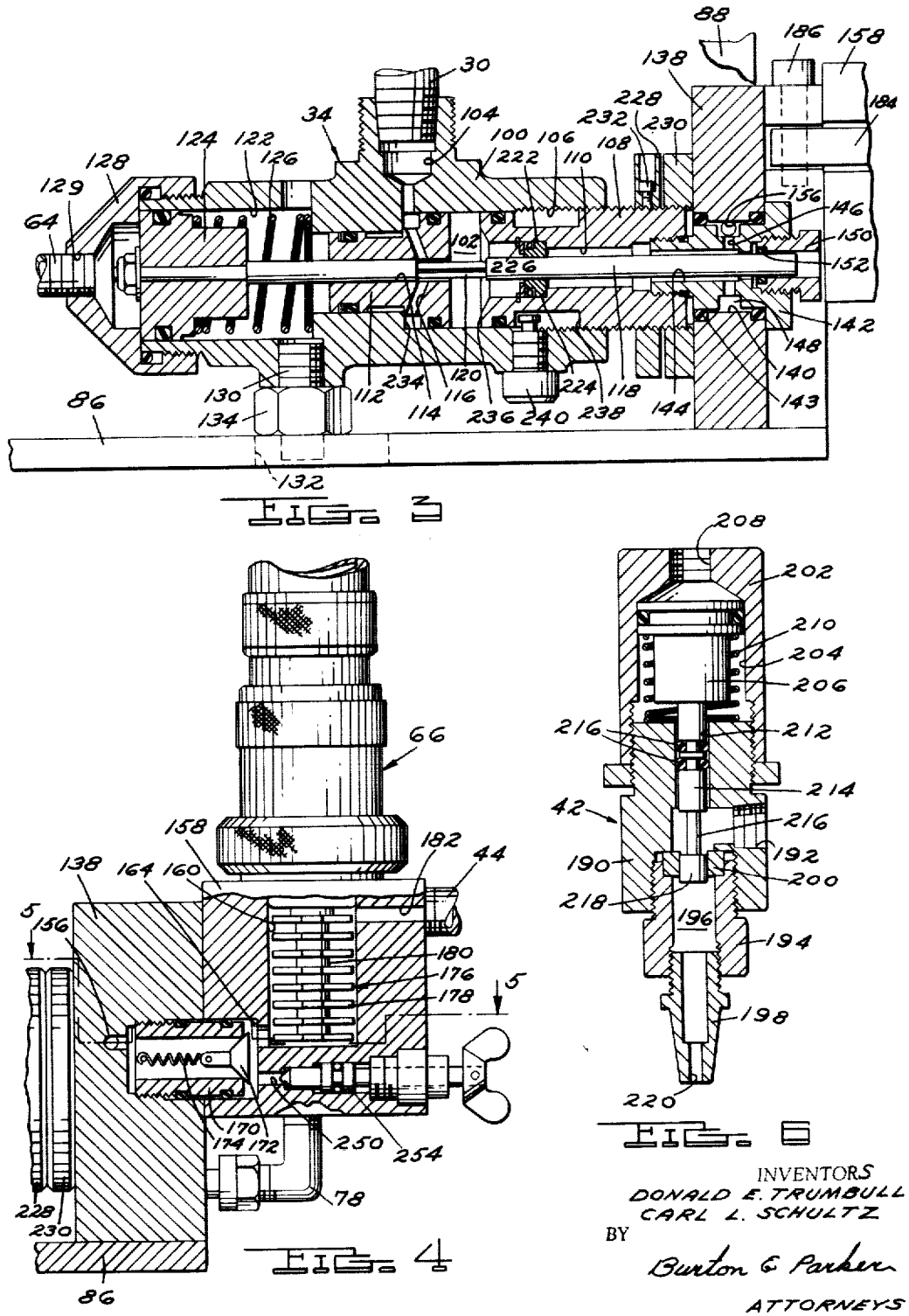

United States Patent Office 3,212,676
Patented Oct. 19, 1965

---

3,212,676
QUANTUM METERING, MIXING AND
DISPENSING APPARATUS
Donald E. Trumbull, Birmingham, and Carl L. Schultz,
Detroit, Mich., assignors to Pyles Industries, Inc.,
Southfield, Mich., a corporation of Michigan
Filed Mar. 20, 1963, Ser. No. 266,729
12 Claims. (Cl. 222—71)

This invention relates to an apparatus for receiving a plurality of flowable component materials under pressure, metering each material independently in determined relative proportions and delivering the metered material separately to a mixing device when they are mixed in the metered proportions and dispensed in the form of discrete quanta or "shots" of homogeneous mixture.

The invention has particular utility in the metering, mixing and dispensing of plural-part adhesives, sealants and the like, which generally comprise a base component and an accelerator or catalyst component. To prepare the sealant, adhesive or the like for use, the base and accelerator component materials must be mixed together in determined relative proportions immediately prior to being used. Once mixed, the resultant composition will begin to set up and cure within a relatively short time, dependent upon the characteristics of the component materials in the mixture, and hence the mixing operation must be effected at the point and time of use. The relative proportions of base and catalyst material must be carefully controlled to insure that the resultant product will cure properly, and will possess the requisite viscosity, subsequent strength, durability, etc., all of which are dependent upon the relative proportions of the constituent materials which are mixed together.

The component materials comprising the sealants, adhesives, etc., are generally delivered to the customer in separate containers such as drums or the like. Each material is either removed from its container and placed in an individual tank from which it is pumped, or the materials are pumped directly from their containers to a location whereat they are accurately separately metered in specified relative amounts. Once metered or measured, the component materials are separately delivered to a mixing device where they are intimately mixed to provide a homogeneous mixture and thereafter dispensed for use on the customer's job. This invention relates particularly to a compact apparatus or machine which may be placed in any convenient location and which is capable of metering the base and accelerator component materials in proper proportional amounts, mixing the components together and dispensing measured quanta of the resultant mixture repetitively. However, as will be obvious as the description proceeds, the apparatus or machine disclosed herein may be used to meter, mix and dispense any two fluid materials where accurate proportional metering is required.

Since the introduction of these plural-part compositions, many different devices have been developed to meter the component materials and mix them together, and to dispense the resultant mixture. Some equipment has been provided which is capable of performing all three functions of metering, mixing and dispensing, while other devices have been provided to accomplish only one or two of the three operations. While these prior art devices have been found to operate satisfactorily in particular applications for which they were specifically designed, one of the principal drawbacks has been a lack of versatility and/or adaptability to handle a variety of component materials and compositions having different physical properties.

One of the systems for handling such plural-part materials in use at the present time includes a metering device comprising generally a separate cylinder and piston arrangement for each component material, with the pistons being mechanically connected together for conjoint movement to dispense material from the cylinder. Material is admitted to opposite ends of each cylinder and is dispensed from the cylinder with the pistons being double-acting to dispense material during their stroke in both directions. Valve means are provided for alternately admitting material to opposite ends of each cylinder and for controlling the discharge of material through the cylinder outlets. As the material pistons are mechanically connected together, their strokes are the same and the ratio of materials discharged is governed by the relative diameters of the metering cylinders. In other words, with the piston strokes being constant, the ratio of materials being pumped is directly proportional to the ratio of the diameters of the metering cylinders. Thus in order to effect a change in the relative proportion of component materials being delivered, it is necessary to remove one or both of the cylinder assemblies and replace them with new cylinders having the necessary dimensional relationship between diameters to produce the desired ratio. This replacement of parts to effect variation in material ratio is of course both expensive and time-consuming.

Another possible construction for a device capable of metering component materials to be mixed in determined relative proportions comprises separate metering piston pumps positioned within the receptacle containing the material, with the pump piston rods projecting beyond the containers and being connected together by a pair of pivotally coupled lever arms, with the point of pivotal connection between the arms being adjustable therealong to vary the relative displacement of the pistons within their respective cylinders. While such a device provides for the adjustment of piston stroke in a constant diameter cylinder to achieve a variation in the relative proportions of materials pumped, the adjustment of one of the pumps results in a corresponding opposite adjustment in the other pump; thus when an adjustment is made the output of one pump is increased while the output of the other pump is correspondingly decreased an equal amount. There is no provision in the device for effecting independent variations of the output of each pump. By utilizing single-action piston pumps and suitable control devices, a system can be provided for dispensing discrete quanta of mixed material. However the volume of each quantum of mixture dispensed remains constant because the combined output of the two pumps is constant throughout variation in the relative amounts pumped by each pump.

An apparatus of the prior art specifically designed to meter and mix flowable component materials and dispense metered quanta or "shots" of the resultant mixture has included an enclosed metering chamber for each component material having positive displacement rods of a preselected cross-sectional area shiftable into each chamber to displace metered amounts of material from the chambers. The displacement rods are rigidly connected together and are shifted conjointly to dispense material from the metering chambers to a mixer, and the combined volume of material dispensed may be varied by varying the length of stroke of the displacement rods. In such device the relative proportions of the component materials are determined by the relationship between the diameters of the displacement rods, and hence in order to vary the proportions of component materials it is necessary to replace one or both of the displacement rods with similar rods of a different diameter.

It is therefore a general object of the invention to provide an apparatus for a system for metering and mixing a plurality of component materials and dispensing discrete quanta or "shots" of the resultant mixture which overcomes to a great extent the shortcomings of prior art devices such as those enumerated hereinabove, and wherein each metering means of the apparatus is independently operable and individually adjustable to provide for variation of both the relative proportions of component material being delivered and the size of the quantum of mixture being dispensed.

Another general object of the invention is the provision of apparatus capable of individually metering accurate amounts of flowable component materials and mixing the metered materials together to provide a homogeneous mixture and dispensing determined quanta of the mixture on demand.

A further object is the provision of a machine of the character described which is capable of repetitively dispensing accurately metered quanta of mixture comprising determined relative proportions of component material, which machine is compact and may be located in a confined space at the point of use with the relatively large containers from which the component materials are fed to the machine being placed in any convenient location remote the machine.

Another object is the provision of a machine for repetitively dispensing accurate quanta or "shots" of a homogeneous mixture comprising a plurality of component materials mixed together in a preselected ratio, which machine includes means for selectively varying both the ratio of component materials in the mixture and the volume of the quanta of the mixture dispensed, which variations may be easily and conveniently effected by a simple adjustment without dismantling the machine and/or replacing any parts thereof.

An additional object is the provision of a compact machine capable of receiving a plurality of component materials under pressure from respective sources located remote the machine, accurately metering predetermined amounts of each component material independently, mixing the metered materials together to provide a homogeneous mixture, and repetitively dispensing quanta of the mixture to any desired location, with each quantum of mixture dispensed being of a preselected volume.

A more particular object is the provision of a machine of the character described having a plurality of component material metering devices each comprising an enclosed metering chamber the effective volume of which may be independently varied without the necessity of dismantling any portion of the machine or changing parts to effect such variation. By utilizing metering devices thus selectively adjustable, the amounts of each component material metered by the devices may be independently varied whereby both the ratio between component materials and the total size of each quantum of mixture dispensed may be accurately predetermined. Hence the size of each "shot" of mixture dispensed from the machine is determined by the combined volumes of component materials discharged by the metering devices, and the relative proportion of component materials in the mixture is determined by the volume of component material discharged by each metering device. Therefore both the size of "shot" of mixture dispensed and the ratio of component materials in each "shot" may be selectively varied by varying the effective volumes of the metering chambers.

A specific object of the invention is the provision of a compact machine for metering and then mixing together a plurality of flowable component materials in determined relative proportions and dispensing quanta of the resulting mixture, which machine comprises a selectively individually variable volume metering chamber for each component material having an independently operable material actuating piston therein and a valve element controlling material flow into and out of the chamber; a mixing chamber having inlets coupled through relatively short, non-expansible lines to each metering chamber outlet, a mixing rotor in the mixing chamber and an outlet for the mixture; and a mixture dispensing valve coupled to the mixer outlet including a nozzle and having a valve element defining a portion retractable away from the nozzle to suck back mixture and prevent drooling of material from the nozzle when the dispensing valve is closed; with each of said material pistons being responsive to the pressure of incoming material thereagainst when its respective chamber outlet is open to shift theretoward, displacing a metered amount of material from the metering chamber to the mixing chamber, and in turn displacing a quantum of mixture from the mixing chamber equal to the combined volume of component materials displaced from the metering chambers.

A concomitant object is the provision of such a machine wherein the pressure of incoming component material to each metering chamber acts against the rear face of the material piston to shift the piston, whereby the pressure on the inlet side of the material piston is always greater than the pressure against the outlet side preventing any leakage of the material back past the piston during dispensing of material.

Other objects, advantageous and meritorious features will more fully appear from the following specification, claims and accompanying drawings, wherein:

FIG. 1 is a top plan view of apparatus involving the invention with the cover broken away to show the working parts;

FIG. 2 is a side elevation of the apparatus shown in FIG. 1 with the cover being similarly broken away to show the working parts;

FIG. 3 is a cross-sectional view of one of the metering valves of the apparatus taken along line 3—3 of FIG. 1;

FIG. 4 is a cross-sectional view of the mixer of the apparatus taken along line 4—4 of FIG. 1;

FIG. 5 is a cross-sectional view taken along line 5—5 of FIG. 4;

FIG. 6 is a longitudinal cross-sectional view of the dispensing valve of the apparatus.

Figure 7:
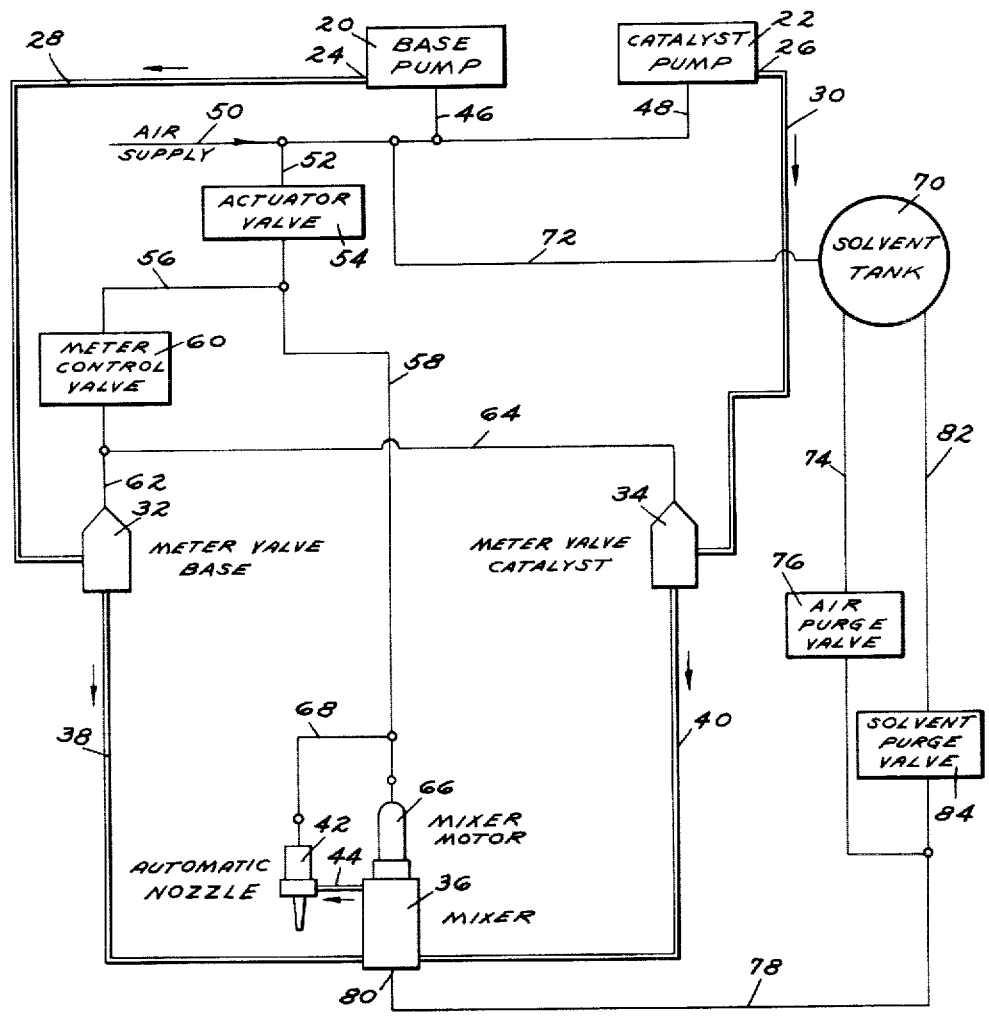
FIG. 7 is a schematic representation of the control system and fluid pressure lines of the apparatus.

Referring first to FIG. 7, there is shown therein a pair of pumps 20 and 22, or what might be appropriately termed devices for supplying material under pressure, which are adapted to deliver material from discharge ports 24 and 26 in the direction of the arrows through lines 28 and 30 to respective metering valves 32 and 34. In the metering valves the component materials from the pumps are measured into determined relative quantities and thereafter discharged to a mixer 36 in the direction of the arrows through lines 38 and 40. Once initimately mixed to provide a homogeneous composition, such composition is fed to an automatic nozzle 42 through line 44 in the direction of the arrow. The composition or mixture is then dispensed from nozzle 42 to the point of use.

The system of FIG. 7 is controlled by air pressure, although it will be obvious to those skilled in the art that such control could be accomplished hydraulically or electrically. Pumps 20 and 22 are of conventional design and need not be described except to point out that they are adapted to receive component materials to be pumped and to discharge the materials under pressure into lines 28 and 30. Each pump includes an air driving motor, not specifically shown in the drawing, to which air is supplied through air lines 46 and 48 respectively from a source of air entering the system via supply air line 50.

Supply air is also fed from line 50 through branch line 52 to an actuator valve 54 which controls the delivery of air to operate the meter valves 32 and 34, mixer 36 and nozzle 42. Two branch air lines 56 and 58 deliver pressure air from actuator 54, with line 56 supplying air through a manually operated meter control valve 60 to lines 62 and 64 coupled to the meter valve. Line 58 supplies air to the mixer motor 66 driving the mixer 36 and through branch line 68 to the automatic nozzle 42.

There is also provided in the system means for flushing the mixer 36 and nozzle 42 with solvent and air. As the materials the apparatus is designed to handle begin to set up or cure within a short time after the components are mixed together, if the system is to remain idle for any length of time the portions of the system containing the mixed materials must be flushed out and purged of the mixture before curing occurs. There is provided for this purpose a solvent tank 70 containing a suitable solvent. The tank 70 is pressurized by air from air line 72. Flushing air to the mixer and automatic nozzle is carried through line 74, air purge valve 76 and line 78 to a port 80 in the mixer body, while solvent to flush these portions of the system may flow through line 82, solvent purge valve 84 and line 78 to the same port 80 in the mixer. The manner in which air and solvent purge is accomplished is more fully described hereinafter.

Turning now to FIGS. 1-3 inclusive, the meter valves 32 and 34 are shown supported on a base member 86, and an enclosing cover 88 is provided to house the valves and their associated piping, etc. Cover 88 is retained in place on the base by a stud 90 upstanding from the base and projecting through an aperture 92 in the cover, and a knob or the like 94 threaded on the stud end holds the cover down in place against the base. Removal of knob 94 permits the cover to be lifted from the base, exposing the valve. The base meter valve 32 and the catalyst meter valve 34 are identical in construction, and therefore the following description of the catalyst valve 34 will suffice for both.

As shown most clearly in FIG. 3, the catalyst meter valve 34 in general comprises a body 100 defining a metering chamber 102 having a component material inlet 104 threadedly coupled to the catalyst material supply line 30. The open forward end of body 100 is internally threaded as at 106 and an externally threaded end wall member 108 is threadedly engaged within the body and is provided with an outlet passage 110 extending axially therethrough. Within metering chamber 102 there is disposed an independently operable free-floating material piston 112 having a central bore 114 and material conducting passages 116 therethrough for admitting material from inlet 104 to the chamber 102 forwardly of the piston. A spool type valve element or rod 118 extends through the piston bore and projects completely through the outlet passage 110 and has an intermediate undercut portion 120 to accomplish the valving function, as described more fully hereinbelow.

The rear end of valve body 100 defines an air cylinder 122 having an air piston 124 shiftably disposed therein and spring biased toward the rear of the cylinder by a coil spring 126. Valve rod 118 is connected to the air piston 124 as shown in FIG. 3. An end closure cap 128 is threaded on the rear end of the body 100 and has a port 129 therein connected to air supply line 64. Air pressurization of line 64 shifts the piston 124 and the valve element 118 forwardly, and depressurization allows return of the piston and valve element to the position shown under the biasing effect of coil spring 126. The valve body 100 is positioned on the base 86 by means of a short rod or stud 130 having one end threaded into the valve body 100 and the opposite end projecting into and engaging a slot 132 in the base 86. A nut 134 threadedly engaged on the stud 130 supports the valve body 100 on the base 86.

Upstanding from the base 86 and secured thereto as by screws or the like 136 (see FIG. 2) adjacent the forward end of the meter valves 32 and 34 is a manifold block 138 having a pair of apertures 140 extending therethrough in axial alignment with the longitudinal axes of the meter valves 32 and 34 (see FIGS. 3 and 5). A block 142 extends through each aperture 140 and manifold 138, and each block is rotatable within its respective aperture, and is provided with sealing means such as the O-ring shown at 143 in FIG. 3. Each block 142 is provided with a longitudinally extending material passageway 144 and a circumferential undercut intermediate opposite ends thereof defining an annular space 148. Transverse material passages 146 in each block establish communication between passage 144 and annular undercut 148. A sleeve-like plug 150 threaded into each block 142 supports the outer end of the valve elements 118 and has a sealing ring 152 entrapped therein preventing component material from escaping along the valve rod past the plug. This structure is identical for both meter valves 32 and 34, and is shown for valve 34 in FIG. 3. Manifold block 138 is provided with a pair of material conducting passages 154 and 156 (see FIG. 5) through which the base and catalyst materials are separately delivered to the mixer 36 from the meter valves 32 and 34.

The mixer 36 as shown in FIGS. 4 and 5 comprises a generally rectangular body 158 defining a cylindrical mixing chamber 160 having inlet passages 162 and 164 for admitting the base and catalyst materials respectively to the mixing chamber. The passages 162 and 164 are counterbored as shown, as are the manifold passages 154 and 156 to accommodate a pair of check valves 166 and 168. Each check valve comprises a sleeve-like body 170 having a rear end portion threaded into the counterbore in passages 154 and 156 and a forward end projecting into the counterbores of passages 162 and 164. O-ring seals are provided as shown encircling the check valve to prevent discharge of material from the system around the valve. The forward end of each valve body defines a valve seat against which a valve element 172 is yieldingly biased by a coil spring or the like 174 as shown in FIG. 4. The check valves 166 and 168 are responsive to material pressure in passages 154 and 156 to shift valve elements 172 counter the spring 174 and permit material to flow through into the passages 162 and 164 and thence into the lower end of mixing chamber 160, and operate to prevent the reverse flow of material from the mixer back into the passages 154 and 156.

A mixing loader 176 is supported in the mixing chamber 160 and preferably includes a plurality of perforated discs 178 mounted in spaced apart relation upon a shaft 180, which shaft is connected to the air driven mixer motor 66 which may be operated to rotate the rotor. An outlet passage 182 at the top of the mixing chamber 160 communicates with line 44 coupled to the automatic nozzle 42. The mixer assembly and automatic nozzle may be releasably supported in the apparatus by a pair of pivotal arms, one of which is shown in FIGS. 2 and 3 at 184. Each arm 184 is pivotally secured to the manifold block 138 such as by the provision of a cap screw 186 or the like threaded into the manifold block 138. The other end of each arm 184 is provided with a wing nut 188 threadedly engaged thereon, and upon loosening of the wing nuts and swinging of the arms 184 away from the mixer body 158, the mixer assembly and automatic nozzle may be bodily removed from the apparatus by disengaging the mixer body from the projecting ends of the check valves 166 and 168.

The mixed material from the mixer 36 is fed through the line or pipe 44 into the automatic nozzle 42, which is shown in cross-section in FIG. 6. Such might be termed a dispensing valve, and in general comprises a body 190 having a threaded inlet port 192 coupled to the pipe 44 (see FIG. 2). Threadedly receiving in the lower or dispensing end of body 190 is an outlet block 194 having an outlet passage 196 opening therethrough, which block 194 is in turn coupled to a dispensing nozzle 198. An outlet defining insert member 200 is held and trapped between the body 190 and the block 194 as shown. Threaded on to the upper end of the body 190 is an end cap 202 defining an air cylinder 204 within which there is positioned for shiftable movement an air-operated piston 206. Rearwardly of piston 206 cap 200 is provided with an internally threaded air inlet port 208 which is coupled to air supply line 68 (see FIGS. 2 and 7). A coil spring 210 yieldingly biases the piston 206 toward the position shown in FIG. 6.

Coupled to the piston 206 and projecting forwardly through a suitable bore 212 and body 190 is a valve element 214 having O-ring seals 216 to prevent material leakage around the valve into air cylinder 204. Rod 214 exhibits an intermediate undercut portion 216 and a cylindrical forward end 218 sealingly engageable within the outlet insert 200. With material under pressure entering the body 190 through inlet 192, pressurization of port 208 shifts valve rod 214 forwardly from the position shown to a position disposing undercut 216 opposite the outlet 200. In this position material under pressure is allowed to flow through passage 196 and is dispensed through the opening 220 and dispensing nozzle 198. On depressurization of port 208, valve rod 214 retracts to its original position under the bias of spring 210, retracting valve rod end 218 from passage 196. As forward movement of the valve rod displaces a volume of material within passage 196, retraction of the valve rod in effect increases the volume of the passageway 196 and serves to suck back material from the nozzle opening 220 when the outlet is closed, thus preventing material from drooling out of the nozzle between dispensing operations.

As stated hereinabove, the apparatus of the invention is designed to repetitively dispense measured quanta or "shots" of mixture, and embodies a construction whereby both the total volume of each "shot" and the ratio of component materials in each "shot" may be varied by a simple adjustment without dismantling the machine or replacing any parts thereof. This is accomplished by the novel construction of the meter valves 32 and 34, and as the valves are identical, a description of the catalyst meter valve 34 will suffice for both.

Referring back again to FIG. 3, valve 34 comprises a body 100 supported for limited longitudinal movement on base 86 but held against rotational movement by the engagement of stud 130 within the slot 132 in the base. As can be seen, the nut 134 may be adjustably positioned on the stud 130 to insure axial alignment of the valve 134 with respect to aperture 140 in the manifold block 138. End wall member 108 is provided with an outlet defining insert 222 held against movement abutting the shoulder 224 by a snap ring or the like 226. Insert 222 sealingly encircles valve element 118, normally preventing any flow of material along the valve from metering chamber 102 to outlet passage 110. It can be seen that the passages 110 and 144 are of a greater diameter than the valve element 118 so that the materials can flow therethrough through the manifold block 138 when the outlet is open.

Threadedly engaged on the outer end of member 108 are a pair of lock nuts 228 and 230, one of which 228 is fixed upon the member by a set screw 232, and the other of which is freely rotatable with respect to the member 108. With nut 130 positioned as shown abutting the manifold block 138, engagement of the block 142 with the member 108 serves to hold the metering valve 34 in place within the apparatus.

The manner in which the meter valves 32 and 34 operate to meter the component materials is more fully described hereinafter. However, it will be apparent from an examination of FIG. 3 that the material piston 112 shifts from the position shown, where it is in abutment with a shoulder 234 and the body 100, to a position where the forward piston face abuts the inner end 236 of end wall member 108. As the volume of component material dispensed from the valve 34 is determined by the length of the piston stroke as it moves up against end wall 236, and the length of piston stroke may be varied by shifting the member 108 with respect to body 100, the volume of material dispensed may be determined by selectively moving the end wall member 108 within the body 100. Putting it another way, the effective volume of the metering chamber 102, and hence the volumetric output of the meter valve, may be selectively varied by shifting the member 108 with respect to the valve body 100.

To vary the length of the metering chamber 102, lock nut 230 is backed up from engagement with the manifold block 138, and then lock nut 228 is rotated, threading end wall member into or out of valve body 100 to locate the inner end 236 of member 108 at the desired position. When properly adjusted, lock nut 228 is held against rotation, and lock nut 230 is rotated back into abutment against the manifold block 138. When this has been done, the meter valve is ready for operation. Member 108 may be provided with an annular undercut portion 238, with a stop screw 240 threaded into the valve body 100 and projecting into the undercut to limit the distance the member 108 may be adjusted and to prevent accidentally uncoupling of the member 108 from the body 100.

*Operation*

Where it is desired to dispense measured quanta or "shots" of the plural part material, each of the meter valves 32 and 34 is first adjusted to deliver the requisite amounts of base and catalyst material to the mixing chamber. To assure correct adjustment, the mixer assembly is removed from the apparatus by loosening the arms 184 and pulling the mixer from the manifold block 138. With the main air supply connected, base pump 20 is connected to meter valve 32 through line 28. Meter control valve 60 is opened, and actuator 54 is then operated to fill meter valve 32 and the manifold passages with base material, and the operation is continued until base material is discharged air-free from check valve 166. The check valves 166 and 168 are now exposed as the meter 36 has been removed from the unit. Manifold 138 may be provided with lead valves 242 and 244 (see FIG. 1) communicating with the manifold passages to permit any entrapped air to escape from the system. With the material lines, passages and meter valve 32 filled with base material, the meter valve is then adjusted as hereinabove described until the proper amount of base material is discharged from check valve 166 during each cycle of operation. The same procedure is then repeated for the catalyst meter valve 34 to provide the correct amount of catalyst material dispensed from check valve 168 during each cycle of operation.

For example, assume that a "shot" size of two cubic centimeter is required, and that the ratio of base to catalyst material is 1-to-1. Therefore each meter valve must be adjusted to deliver one cc. of material during each cycle of operation. On the other hand, if a "shot" size of three cc. is required and the ratio of base to catalyst material is 2-to-1, the base meter valve 32 would be adjusted to deliver two cc.'s, and the catalyst meter valve 34 adjusted to deliver one cc. Once the meter valves 32 and 34 have been calibrated, and the apparatus is primed with material, cover 88, is installed, and the mixed assembly and nozzle 42 are mounted on the manifold block 138, and all air control lines and solvent lines are connected. The unit is then cycled repeatedly by the actuator valve 54 until mixed material is dispensed air-free from the nozzle 198. The machine is now ready to deliver measured "shots" of mixed material comprising the base and catalyst components in the predetermined relative proportions on demand.

To dispense a quantum of plural part material, actuator valve 54 is operated, supplying pressure air to meter valves 32 and 34, mixer motor 66 and automatic nozzle 42 (see FIG. 7). This starts the mixer motor 66 to rotate the mixing rotor 176 (FIG. 4) and pressurizes port 208 of nozzle 42 (FIG. 6) to shift the piston 206 and valve rod 214 to open the dispensing outlet 200. Pressurization of port 129 through line 64 (FIG. 3) and a similar port in the other meter valve shifts the air pistons 124 in the meter valves, in turn shifting valve elements 118. The shifting of valve elements 118 disposes the undercut portion 120 thereof opposite the outlet 222, opening the outlet and blocking the piston passage 116.

As the material in chamber 102 is under pressure from its respective pump 20 or 22, opening of the outlet relieves the pressure forwardly of the piston, and the piston 112 is shifted from its position of FIG. 3 toward and into abutment with the end face 236 of member 108, forcing the determined volume of material through passages 110, 144 and 156, and through check valve 168 in passage 164 into the lower end of the mixing chamber 160. Similarly, base material is forced through passage 154, check valve 166, passage 162 and into the mixing chamber 160. In short, the material piston in each meter valve metering chamber shifts independently upon the opening of the chamber outlet in response to the pressure of incoming material to discharge from the metering chamber and into the mixing chamber a predetermined amount of each component material. the amount discharged from each chamber is of course dependent upon the length of the chamber as determined by the selective adjustment of the end wall member 108, and the relative proportions of bas and catalyst supplied to the mixing chamber is thus dependent upon the length of the metering chambers in the valves 32 and 34.

It should be noted that the meter valves 32 and 34 must be retained pressurized until the material pistons shift through their respective strokes. As the piston strokes may be different, and the base and catalyst materials in the respective metering chambers may be of quite different viscosities, the pistons do not shift exactly in unison. Therefore, actuator valve 54 must be retained closed a determined period until both of the pistons are shifted through their entire stroke. Actuator valve 54 may be provided with a timed-delay control to insure that air lines 62 and 64 remain pressurized a sufficient length of time to permit the pistons to shift through their stroke. When lines 62 and 64 are depressurized, the valve elements in the meter valves shift back to their normal position at the rear of their respective metering chambers 102, as shown in FIG. 3 for the valve rod 118 of catalyst valve 34. Retraction of the valve element 118 closes the outlet 222 and opens the piston bore 114 and passages 116, permitting material under pressure to flow through inlet 104 into chamber 102 forwardly of the piston. As the forward face of piston 112 is of greater effective area than the rear face of the piston, the pressure of material against the forward face is greater, thereby causing the piston to shift rearwardly in the metering chamber 102 until its abuts shoulder 234, refilling the metering chamber with component material to be dispensed on the next cycle of operation. Once the material pistons have shifted back in their respective chambers, the unit may again be actuated to dispense another quantum of mixed material through the dispensing nozzle 198. It should be noted that each of the valve rods in the meter valves 32 and 34 such as rod 118 (FIG. 3) extends completely through the metering chamber and the material passages and projects therebeyond during all positions of its travel, so that the volumetric displacement of the rod within the material spaces is constant at all times, so that shifting of the valve rod does not affect the amount of material dispensed from the meter valves.

Referring to FIGS. 4 and 5, the pressure of material from the meter valves 32 and 34 acts to shift the check valves 166 and 168, admitting base and catalyst materials to the bottom of the mixing chamber 160. As the mixing chamber 160, line 44 and nozzle 42 have all been primed full of material, the introduction of the base and catalyst materials to the bottom of the mixing chamber displaces a volume of mixture from the passage 182 at the top of the chamber equal in volume to the combined volumes of component materials introduced, and thus dispensing a corresponding volume of mixture from the automatic nozzle 42. Thus the size of each quantum of mixture dispensed from the device is equal to the sum of the volumes of the component materials metered by the meter valves 32 and 34. As the air supply lines to the meter valves 32 and 34 and to the dispensing nozzle 42 are pressurized simultaneously by actuator valve 54, the nozzle 42 opens and closes conjointly with the pressurization and depressurization of the meter valves. Mixer motor 66 also operates to rotate mixing rotor 176 during the entire period that actuator 54 is open. This arrangement has been found satisfactory to achieve intimate mixing of most plural part materials. However, should it be necessary to operate the mixing rotor continuously to achieve intimate mixing, such could obviously be accomplished by the provision of an independently controlled air supply line furnishing pressure air to the mixer motor 66.

*Air and solvent purge*

As can be seen from the above, the component materials do not come into contact with each other until they are admitted to the lower end of the mixer 36 through passages 162 and 164 (see FIG. 5). As soon as they do come in contact, however, they begin to cure or harden, and thus mixed material must not be let stand in the mixer 36, nozzle 42 or the line 44 for any length of time. As pointed out hereinabove, the mixer assembly including the mixer 36 and nozzle 42 may be removed bodily from the apparatus and may thus be cleaned after removal. However, there is included in the apparatus means for flushing or purging the system of mixture and cleaning these parts without disassembling any portion of the apparatus.

To provide for air and solvent cleaning of these parts, line 78 communicates with two passages in the lower end of the mixer body 158, one of which passages is shown in FIG. 4 at 250. Each of these passages communicates with the counterbored portion of a respective material inlet passage 162 and 164. Admission of air and solvent to the mixer is controlled by suitable needle valves 252 and 254.

Pressure air is supplied from line 50 to the solvent tank 70 via line 72 to pressurize the tank. When the apparatus is to be left idle for any length of time, meter control valve 60 is closed and the tank 70 filled with solvent. Air purge valve 76 is then opened, and both needle valves 252 and 254 opened, and actuator valve 54 held in open position to rotate the mixing motor 176 and hold the outlet 200 in nozzle 42 open to expel the remaining mixture from the mixer 36 and automatic nozzle 42. Air purge valve 76 and needle valves 252 and 254 are closed after all the mixture is expelled from the dispensing nozzle 198, and the solvent purge valve 84 is opened. Needle valves 252 and 254 are then slowly reopened to admit solvent through line 78 into the mixer and automatic nozzle. When these parts have been thoroughly flushed with solvent, the solvent purge valve 84 is closed and the air purge valve 76 again opened to flush air through the assembly and clean all the solvent from the mixer 36 and nozzle 42. The air and solvent purge may be repeated to insure that all of the parts have been completely cleaned of any residue of mixed material. When this operation has been completed, the air and solvent purge valves and needle valves are closed, the meter control valve 60 is opened, and the apparatus is ready for the next production run.

What is claimed is:

1. In apparatus for metering and mixing a plurality of flowable components materials and dispensing the resultant mixture, the combination comprising: a source of each component material under pressure; an enclosed metering chamber for each component material having an inlet coupled to a respective source and an outlet, each metering chamber including means for selectively individually varying the effective volume of the chamber; an independently operable material piston in each metering chamber; valve means cooperating with each chamber inlet and outlet and operable to open the inlet and close the outlet and alternately operable to close the inlet and open the outlet; actuating means coupled to all of said valve means for conjointly operating the same; each of said material pistons being responsive solely to incoming material presure there against to shift toward said outlet and discharge material from the metering chamber upon the opening of the outlet; a mixing chamber having an inlet for each component material coupled in closed feed relation to a respective outlet of one of said metering chambers and having an outlet for said mixture; a rotor in said mixing chamber; prime mover means for rotating said rotor; and control means coupled to said valve actuating means and said prime mover means and operable to insure rotation of said rotor upon the operation of said actuating means shifting the valve means to close the inlets and open the outlets of said metering chambers.

2. In apparatus for metering, mixing and dispensing a plurality of flowable component materials, the combination comprising: a source of each component material under pressure; an enclosed metering chamber for each component material having an inlet coupled to a respective source and an outlet, each metering chamber including end wall means individually selectively shiftable to vary the effective volume of said metering chamber, an independently operable material piston shiftably disposed within the metering chamber to discharge material therefrom and a shiftable valve element in the chamber normally positioned opening the inlet and blocking the outlet and shiftable to a second position closing the inlet and opening the outlet; valve actuating means operably coupled to each of said valve elements for conjointly shifting the elements between said positions; mixing means having an inlet for each component material coupled in closed feed relation to a respective metering chamber outlet and having an outlet for said mixture; and prime mover means coupled to said mixing means to drive the same; each of said material pistons being responsive solely to the pressure of incoming material thereagainst upon the opening of its associated metering chamber outlet to shift toward the outlet discharging material to said mixing means, thereby displacing a quantum of mixture through the mixing means outlet equal to the combined volumes of said component materials discharged from said metering chambers.

3. In apparatus for metering, mixing and dispensing a plurality of flowable component materials, the combination comprising: a source of each component material under pressure; an enclosed metering chamber for each component material having an inlet coupled to a respective source and an outlet, each metering chamber including end wall means individually selectably shiftable to vary the effective length of such metering chamber, an independently operable material piston disposed for reciprocable movement in the metering chamber having passageway means therein admitting material to the chamber forwardly of the piston, and a valve element extending through the piston and projecting into the chamber outlet and shiftable from a position opening said piston passageway means while blocking the outlet to a position blocking the passageway means and opening the outlet; actuating means coupled to each of said valve elements for simultaneously shifting the elements; a mixing chamber having an inlet for each component material coupled in closed feed relation to a respective metering chamber outlet and having an outlet for said mixture; a mixing rotor disposed for rotation in the mixing chamber; motive means coupled to said rotor to rotate the same; and control means coupled to said valve element actuating means and to said motive means for insuring rotation of said mixing rotor when said valve elements are shifted to their position opening the metering chamber outlets; each of said material pistons being responsive to the pressure of component material thereagainst from a respective source of material upon the opening of said metering chamber outlet to shift into abutment with said end wall means, dispensing material from the metering chambers into the mixing chamber and thereby displacing a quantum of material from said mixing chamber through the outlet thereof equal to the combined volumes of component materials dispensed from said metering chambers.

4. In apparatus for dispensing a mixture of flowable component materials, the combination comprising: a source of each component material under pressure; a metering valve for each component material, each valve comprising a body defining a cylindrical metering chamber having an inlet coupled to a respective source of material under pressure and an end wall member defining an outlet opening, said end wall being shiftable relative to the body to selectively vary the effective length of said metering chamber; an independently operable free-floating material actuating piston in each metering chamber intermediate the inlet and outlet having passageway means establishing communication between the inlet and the chamber forwardly of the piston; spool-type valve means extending through each metering chamber and projecting into the outlet thereof and shiftable from a position opening said piston passageway means and blocking said outlet to a position blocking the passageway means and opening the outlet; each of said material pistons being independently responsive to the pressure of incoming material thereagainst to shift toward and into abutment with said end wall member upon the opening of the metering chamber outlet to dispense a quantum of material from the chamber equal to the chamber volume defined by the product of piston diameter times length of piston stroke; and mixing means including an enclosed mixing chamber having a rotor disposed for rotation therein and an inlet for each component material coupled to a respective outlet of one of said metering chambers and an outlet for said mixture; and motive means coupled to said valve elements and to said mixing rotor for causing rotation of said rotor simultaneously with the shifting of said valve elements to their positions opening the metering chamber outlets, whereby the quanta of component materials dispensed from said metering chambers displace a volume of said mixture from said mixing chamber equal to the combined volumes of component materials dispensed from said metering chambers.

5. The invention as defined in claim 4 characterized in that each metering valve comprises a valve body and an end wall member exhibiting complementary threaded length selectively engageable to vary the volume of said metering chamber by rotation of said end wall member with respect to said metering valve body.

6. Apparatus for metering, mixing and dispensing a plurality of flowable component materials comprising: a source of each component material under pressure; an enclosed metering chamber for each component material having an inlet communicatively coupled to a respective source and an outlet, each metering chamber including means for selectively individually varying the effective volume of the chamber, an independently operable material piston responsive to the pressure of incoming material thereagainst when said outlet is opened to shift toward the outlet and dispense component material from the chamber and a valve element extending through the chamber normally positioned admitting material to the chamber and blocking the outlet and shiftable to a second position blocking entry to the chamber and opening the outlet; actuating means coupled to said valve elements for shifting all of the elements simultaneously; mixing means having an inlet for each component material coupled in closed feed relation to a respective metering chamber outlet and having an outlet for said mixture; motive means coupled to said mixing means to drive the same and thereby intimately mix said component materials together to provide a homogeneous mixture; and mixture dispensing valve means comprising a material-conducting passage coupled at one end to said mixing chamber outlet and having an opposite end terminating in a discharge nozzle, a valve element shiftable between alternate positions opening and closing said passage to the flow of mixture therethrough, and means for shifting said valve element between said alternate positions with the element having a portion retractable from the nozzle during movement closing the passage to suck back mixture in the nozzle and prevent drooling of the mixture from the nozzle when the dispensing valve is closed.

7. Apparatus for metering, mixing and dispensing a plurality of flowable component materials comprising: a source of each component material under pressure; a component metering chamber for each material, each of said chambers being open at one end and having a material inlet remote said open end coupled in closed feed relation to a respective source of material, an end wall member sealingly engaging said open end of the chamber and selectively shiftable axially of the chamber to vary the length thereof and having a passageway through the end wall defining a material outlet, an independently operable material actuating piston in each metering chamber intermediate said inlet and said outlet having passageway means therein for admitting material to the chamber forwardly of the piston and provided with an outlet face of greater effective area than the inlet face of the piston, a valve element in said chamber projecting through said piston and through said outlet shiftable from a position opening the piston passageway means and closing the outlet to a position closing the passageway means and opening the outlet, and actuating means coupled to said valve element to shift the same; said material piston being responsive to the pressure of incoming material against said inlet face when the outlet is opened to shift into abutment with said end wall and discharge material through the outlet and responsive to the pressure of material against said outlet face when the passageway means are opened to shift away from the end wall and recharge the chamber with material; and mixing means including a mixing chamber having an inlet for each component material coupled in closed feed relation to a respective metering chamber outlet and having an outlet for said mixture, with a rotor disposed in said chamber for rotation to intimately mix said component materials together; and a prime mover coupled to said rotor to rotate the same; with a predetermined quantum of component material being discharged from each metering chamber upon the shifting of said material pistons into abutment with said end walls discharging component material from the metering chambers into the mixing chamber and displacing from the mixing chamber a quantum of mixed material equal in volume to the combined volumes of component materials discharged from the metering chambers.

8. The invention as defined in claim 7 characterized in that each of said valve elements extends completely through and beyond its respective metering chamber to maintain the volumetric displacement of the valve element within the chamber substantially constant throughout the shiftable movement of the element.

9. The invention as defined in claim 7 characterized in that each metering chamber includes stationary positive stop means for limiting the shiftable movement of the material piston away from said end wall member, whereby the length of stroke of such material piston is governed solely by the selective positioning of said end wall member within the metering chamber.

10. In apparatus for dispensing a mixture of flowable component materials the combination comprising: a source of each component material under pressure; a separate metering chamber for each component material having an inlet coupled to a respective source and a movable end wall member defining an outlet passage spaced from said inlet; an independently operable piston in each metering chamber intermediate the inlet and outlet having passages therein to admit material to that portion of the chamber between the outlet and the piston; a valve element in each metering chamber extending through the piston and projecting into the chamber outlet and shiftable from a first position opening the piston passages and blocking the outlet to a second position blocking the passages and opening the outlet; actuating means coupled to said valve elements to shift all of the elements simultaneously; a mixing chamber having an inlet for each component material and an outlet for said mixture; a rotor in said chamber; a prime mover coupled to said rotor to rotate the same; a manifold block defining non-expansible material conducting passageways connecting each metering chamber outlet passage with a respective mixing chamber inlet; each of said material pistons being responsive to incoming material pressure thereagainst to shift toward the outlet of its respective chamber when the outlet is opened discharging a preselected volume of component material into said mixing chamber, thereby displacing a quantum of mixture from the mixing chamber equal in volume to the combined volumes of component material discharged by said material pistons from said metering chambers.

11. The invention as defined in claim 10 characterized in that said metering chambers and said end wall members exhibit complementary threaded lengths for adjustably engaging the end wall member in the metering chamber to selectively vary the chamber length, and locking means are provided for maintaining the end wall member in a preselected position and preventing accidental movement of the member with respect to the chamber.

12. The invention as defined in claim 11 characterized in that each of said end wall members are independently sealingly rotatably supported in said manifold block with the outlet passage in each end wall member communicating with a respective passageway in the block during all positions of member rotation, and said metering chambers are each independently supported in the apparatus for limited linear movement, whereby the length of each component material metering chamber may be selectively varied by rotation of the end wall member with respect to its associated metering chamber.

References Cited by the Examiner
UNITED STATES PATENTS

| 1,075,898 | 10/13 | Champ et al. | 222—148 |
| 2,458,230 | 1/49 | Warcup | 222—148 X |
| 2,826,342 | 3/58 | Clark et al. | 222—250 X |
| 3,083,878 | 4/63 | Devine et al. | 222—145 X |
| 3,109,443 | 11/63 | Mastis | 137—204 |

LOUIS J. DEMBO, *Primary Examiner.*

HADD S. LANE, *Examiner.*